US009948460B2

(12) United States Patent
Cheng et al.

(10) Patent No.: US 9,948,460 B2
(45) Date of Patent: Apr. 17, 2018

(54) MULTIVARIATE CRYPTOGRAPHY BASED ON CLIPPED HOPFIELD NEURAL NETWORK

(71) Applicant: City University of Hong Kong, Kowloon (HK)

(72) Inventors: Lee Ming Cheng, Kowloon (HK); Jia Wang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 285 days.

(21) Appl. No.: 14/839,528

(22) Filed: Aug. 28, 2015

(65) Prior Publication Data

US 2017/0063541 A1 Mar. 2, 2017

(51) Int. Cl.
*H04L 9/08* (2006.01)
*H04L 29/06* (2006.01)

(52) U.S. Cl.
CPC ........ *H04L 9/0841* (2013.01); *H04L 63/0442* (2013.01); *H04L 63/061* (2013.01)

(58) Field of Classification Search
CPC . H04L 9/0841; H04L 63/0442; H04L 63/061; H04L 9/28; H04L 9/0838; H04L 9/0866; H04L 9/30
See application file for complete search history.

(56) References Cited

U.S. PATENT DOCUMENTS

| | | | |
|---|---|---|---|
| 7,142,675 B2 | 11/2006 | Cheng et al. | |
| 7,634,666 B2 | 12/2009 | Cheng et al. | |
| 7,643,817 B2 * | 1/2010 | Klug | H04L 63/0442 455/411 |
| 7,961,876 B2 | 6/2011 | Ding | |
| 8,958,560 B2 | 2/2015 | Kipnis et al. | |
| 2003/0161467 A1 * | 8/2003 | Cheng | H04L 9/12 380/44 |
| 2006/0281480 A1 * | 12/2006 | Klug | H04L 63/0442 455/518 |
| 2008/0013716 A1 * | 1/2008 | Ding | H04L 9/3093 380/30 |
| 2010/0049945 A1 * | 2/2010 | Cheng | H04L 9/302 712/36 |
| 2013/0073855 A1 | 3/2013 | Kipnis et al. | |

(Continued)

OTHER PUBLICATIONS

J. Buchmann, S. Bulygin, J. Ding, W. S. A. E Mohamed, F. Werner, "Practical algebraic cryptanalysis for dragon-based cryptosystems, Cryptology and Network Security" (2010) 140-155.

(Continued)

*Primary Examiner* — Shanto M Abedin
(74) *Attorney, Agent, or Firm* — Amin, Turocy & Watson, LLP

(57) ABSTRACT

The systems and methods disclosed herein, in one aspect thereof, can encrypt and decrypt messages using a multivariate extended Clipped Hopfield neural network that uses a Diffie-Hellman like key exchange algorithm. The proposed cryptosystem comprises three stages that are involved in the communication. A first stage, where parameters are initialized and private keys are generated, a second stage where various base matrix pairs and threshold vectors are synchronized between the sender and the recipient, and a third stage, where encryption/decryption is performed.

20 Claims, 11 Drawing Sheets

(56) References Cited

U.S. PATENT DOCUMENTS

| | | | | |
|---|---|---|---|---|
| 2013/0129090 | A1* | 5/2013 | Kipnis | H04L 9/3093 380/255 |
| 2013/0329883 | A1* | 12/2013 | Tamayo-Rios | H04L 9/008 380/28 |
| 2014/0208110 | A1* | 7/2014 | Hiwatari | H04L 9/3093 713/170 |
| 2016/0156595 | A1* | 6/2016 | Wu | H04L 63/0428 713/168 |
| 2017/0034167 | A1* | 2/2017 | Figueira | H04L 63/0876 |

OTHER PUBLICATIONS

E. R. Berlekamp, R. J. McEliece, H. C. Van Tilborg, "On the inherent intractability of certain coding problems", IEEE Transactions on Information Theory 24 (3) (1978) 384-386.

E. Bresson, O. Chevassut, D. Pointcheval, J.-J. Quisquater, "Provably authenticated group Diffie-Hellman key exchange", Proceedings of the 8th ACM conference on Computer and Communications Security, ACM, 2001, pp. 255-264.

E. Bresson, O. Chevassut, D. Pointcheval, "Dynamic group Diffie-Hellman key exchange under standard assumptions", Advances in Cryptology Eurocrypt 2002, Springer, 2002, pp. 321-336.

R. A. Brualdi, "Introductory combinatorics", New York, 1992, pp. 52-55.

N. Courtois, A. Klimov, J. Patarin, A. Shamir, "Efficient algorithms for solving overdefined systems of multivariate polynomial equations", in: Advances in Cryptology Eurocrypt 2000, Springer, 2000, pp. 392-407.

W. Diffie, M. E. Hellman, "New directions in cryptography", Information Theory, IEEE Transactions on 22 (6) (1976) 644-654.

J. Ding, J. E. Gower, D. Schmidt, "Zhuang-zi: A new algorithm for solving multivariate polynomial equations over a finite field.", IACR Cryptology ePrint Archive 2006 (2006) 38.

C. Dods, N. P. Smart, M. Stam, "Hash based digital signature schemes", Cryptography and Coding, Springer, 2005, pp. 96-115.

F. Li, X. Lu, Y. Wang, L. Tian, W. Bao, "Cryptanalysis of little dragon two multivariate public key cryptosystem", International Conference on Computer Application and System Modeling 2010, IEEE, 2010, pp. 292-294.

M. Finiasz, N. Sendrier, "Security bounds for the design of code-based cryptosystems", Advances in Cryptology—Asiacrypt 2009, Springer, 2009, pp. 88-105.

T. Güneysu, V. Lyubashevsky, T. Pöppelmann, "Practical lattice-based cryptography: A signature scheme for embedded systems", Cryptographic Hardware and Embedded Systems—Ches 2012, Springer, 2012, pp. 530-547.

D. O. Hebb, "The organization of behavior: A neuropsychological theory", Psychology Press, 2005.

D. Serre, "Matrices: theory and applications", Springer, 2000, 219 pgs.

M. Steiner, G. Tsudik, M. Waidner, Diffie-hellman key distribution extended to group communication, Proceedings of the 3rd ACM conference on Computer and communications security, ACM, 1996, pp. 31-37.

"IEEE Standard Specifications for Public-Key Cryptography," in IEEE Std 1363-2000, vol., No., pp. 1-228, Aug. 29, 2000.

P. Montgomery, "Modular Multiplication Without Trial Division", Math. Computation, vol. 44, pp. 519-521, 1985.

P. Shor, "Polynomial time algorithms for prime factorization and discrete logarithms on a quantum computer", SIAM Journal on Scientific Computing, 26(1997), pp. 1484.

H. Imai and T. Matsumoto, "Algebraic methods for constructing asymmetric cryptosystems", Algebraic Algorithms and Error-Correcting Codes, 3rd International Conference, AAECC-3, Grenoble, France, Jul. 15-19, 1985.

J. Patarin, "Hidden Field equations (HFE) and isomorphism of polynomials (IP): two new families of asymmetric algorithms", Advances in cryptology-Eurocrypt '96, Springer-Verlag, pp. 3348.

N. Courtois, A. Klimov, J. Patarin, A. Shamir, "Efficient algorithms for solving overdefined systems of multivariate polynomial equations", Advances in Cryptology, —Eurocrypt 2000, vol. 1807, 2000, pp. 392-407.

J. Patarin, N. T. Courtois, and L. Goubin, "Flash, a fast multivariate signature algorithm", CT-RSA'2001, LNCS vol. 2020, pp. 298-307.

L.Wang, B. Yang, Y. Hu and F. Lai, "A Medium—field Multivariate Public key Encryption Scheme", CT-RSA 2006: The Cryptographers Track at the RSA Conference 2006, LNCS 3860, 132-149, Springer, 2006.

J. Ding, B.Y. Yang, "Multivariate Public Key Cryptography", Post-Quantum Cryptography, 2009, pp. 193-241.

S. Samardjiska, D. Gligoroski, "Towards a secure multivariate identity-based encryption", Advances in Intelligent Systems and Computing, vol. 207 AISC, 2013, pp. 59.

J. Patarin, "Cryptanalysis of the Matsumoto and Imai public key scheme of Eurocrypt '88", Advances in Cryptology—Crypto, 95, Springer-Verlag, pp. 248-261.

A. Kipnis and A. Shamir, "Cryptanalysis of the HFE Public Key Cryptosystem by Relinearization", CRYPTO '99, LNCS vol. 1666, pp. 19-30, 1999.

A. Shamir, "On the generation of multivariate polynomials which are hard to factor", Proceeding STOC '93 Proceedings of the twenty-fifth annual ACM symposium on Theory of computing, pp. 796-804.

W.J. Li and T. Lee, "Hopfield Neural Networks for Pane Invariant Matching", IEEE Transactions on Neural Networks, vol. 12, No. 6, Nov. 2001, pp. 1400,1410.

K.C. Leung, S.L. Li, L.M. Cheng, C.K. Chan, "A Symmetric Probabilistic Encryption Scheme Based on CHNN Without Data Expansion", Neural Processing Letters, pp. 93-105, vol. 24, No. 2, Oct. 2006.

C.K. Chan and L.M. Cheng, "The convergence properties of a clipped Hopfield network and its application in the design of keystream generator", IEEE Transactions on Neural Networks, vol. 12, No. 2, pp. 340-348, Mar. 2001.

D. Socek, D. Culibrk, "On the Security of a Clipped Hopfield Neural Network-Based Cryptosystem", Jan. 29, 2008, 10 pgs.

P. Floreen, P. Orponent, "On the Computational Complexity of Analyzing Hopfield Nets", Complex Systems 3 (1989) 577-587.

* cited by examiner

MULTIVARIATE CRYPTOGRAPHY BASED ON CLIPPED HOPFIELD NEURAL NETWORK

TECHNICAL FIELD

This disclosure generally relates to a multivariate public key cryptosystem that uses an extended Clipped Hopfield neural networks and related embodiments.

BACKGROUND

Security issues in electronic communications have been very important in the information age. Public key cryptographies (PKC) such as RSA and ECC (elliptic curve cryptosystems) have been adopted as key components for internet security, and in particular, for e-commerce systems authentication (electronic signatures) and secure communications. The RSA and ECC are mainly constructed from the complexity of integer factorization and discrete logarithm respectively. Although no proof is known for their NP-completeness or NP-hardness, both cryptosystems are still believed to be hard to break using convention systems. However, quantum computers have re-defined what problems are computational tractable and intractable, which has posed a new challenge to the security of classical cryptosystems.

The above-described background is merely intended to provide an overview of contextual information regarding networks, and is not intended to be exhaustive. Additional context may become apparent upon review of one or more of the various non-limiting embodiments of the following detailed description.

BRIEF DESCRIPTION OF THE DRAWINGS

Numerous aspects and embodiments are set forth in the following detailed description, taken in conjunction with the accompanying drawings, in which like reference characters refer to like parts throughout, and in which.

DETAILED DESCRIPTION

Figure 1:
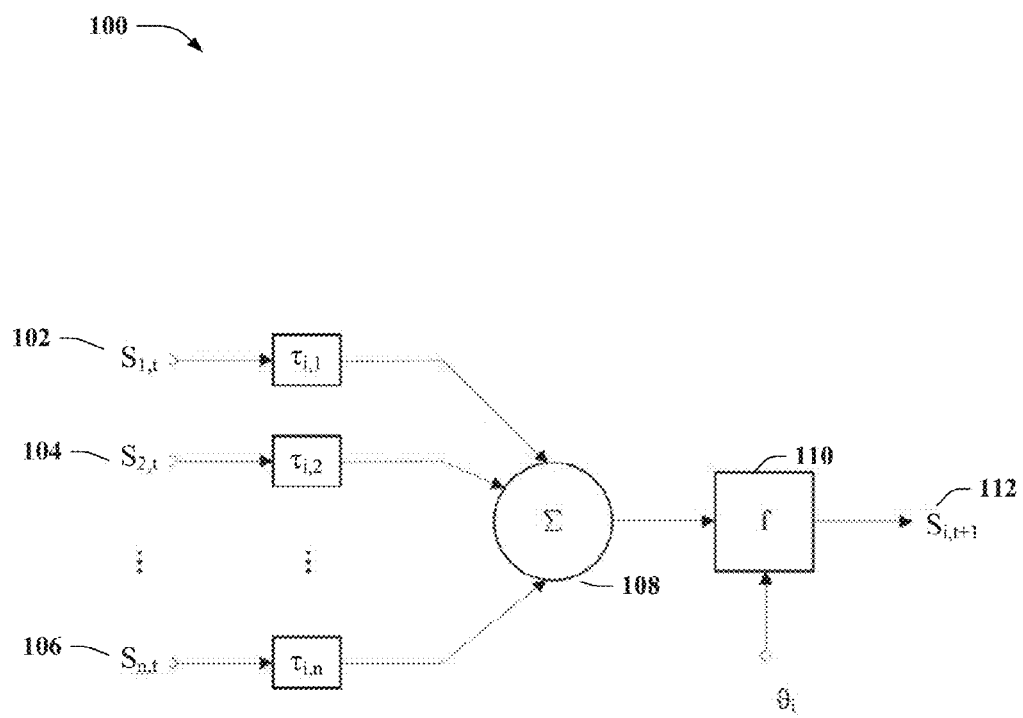
FIG. 1 is an example non-limiting schematic diagram of a model of a neuron according to an aspect or embodiment of the subject disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, molecules, etc. In other instances, well-known structures and devices are shown in block diagram form to facilitate description and illustration of the various embodiments. Additionally, elements in the drawing figures are not necessarily drawn to scale; some areas or elements may be expanded to help improve understanding of certain aspects or embodiments.

The terms "access point," "server," "base server," (BS) and the like, are utilized interchangeably in the subject application, and refer to a network component or appliance that serves and receives data, control, voice, video, sound, gaming, or substantially any data-stream or signaling-stream from a set of subscriber stations. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be noted that such terms can refer to human entities or automated components supported through artificial intelligence (e.g., a capacity to make inferences based on complex mathematical formalisms), which can provide simulated vision, sound recognition and so forth.

It is noted that, terms "user equipment," "device," "user equipment device," "client," and the like are utilized interchangeably in the subject application, unless context warrants particular distinction(s) among the terms. Such terms can refer to network component(s) or appliance(s) that servers and receives data, voice, video, sound, games, or substantially any data-stream or signaling-stream to or from network components and/or other devices. By way of example, a user equipment device and the like, as used herein and throughout this disclosure, can comprise a mobile device such as an electronic device capable of wirelessly sending and receiving data. A user equipment device may have a processor, a memory, a transceiver, an input, and an output. Examples of such devices include cellular telephones, personal digital assistants, portable computers, tablet computers, handheld gaming consoles, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

Furthermore, the terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Aspects or features of the subject specification can be exploited in substantially any radio access network employing respective radio access technologies, e.g., Wi-Fi, global system for mobile communications, universal mobile telecommunications system, worldwide interoperability for microwave access, enhanced general packet radio service, third generation partnership project long term evolution, fourth generation long term evolution, third generation partnership project 2, ultra mobile broadband, high speed packet access, Zigbee, $X^{th}$ generation, long term evolution, or another IEEE 802.XX technology. Additionally, substantially all aspects of the subject specification can be exploited in legacy telecommunication technologies.

The systems and methods disclosed herein, in one aspect thereof, can encrypt and decrypt messages using a multivariate extended Clipped Hopfield neural network that uses a Diffie-Hellman like key exchange algorithm. The proposed cryptosystem comprises three stages that are involved in the communication. A first stage, where parameters are initialized and private keys are generated, a second stage where various base matrix pairs and threshold vectors are synchronized between the sender and the recipient, and a third stage, where encryption/decryption is performed. Initialization and synchronization can be done only once before the first communication of two parties. In order to obtain higher security, the iteration time $\rho$ can be kept as a variable for different sessions.

"Logic" as used herein and throughout this disclosure, refers to any information having the form of instruction signals and/or data that may be applied to direct the operation of a processor. Logic may be formed from signals stored in a memory device. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network is preferably packet-based; however, radio and frequency/amplitude modulations networks can enable communication between communication devices using appropriate analog-digital-analog converters and other elements. Communication is enabled by hardware elements called "transceivers." User equipment devices can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice and/or data traffic) between one or more components can include, wired communications (routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi channels, satellite channels, and/or the like).

A network, as used herein, typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network.

Various embodiments disclosed herein include a system that has a processor and a memory that stores executable instructions, that when executed by the processor facilitate performance of operations. The operations include initializing a system parameter. The operations also include randomly generating a private key based on Diffie-Hellman key exchange with a message recipient device. The operations also include generating a base matrix pair as a function of the private key that is synchronized with another base matrix pair of the message recipient device and determining a threshold vector using the system parameter and the private key resulting in a synchronized threshold vector with the message recipient device. The operations can also include encrypting a communication based on the synchronized threshold vector and the synchronized base matrix pair.

In another embodiment, a method includes determining, by a system comprising a processor, a set of system parameters. The method can also comprise generating a random private key based on a Diffie-Hellman key exchange program with a device associated with a message recipient and generating a base matrix pair as a function of the private key that is synchronized with another base matrix pair of the message recipient. The method can also comprise synchronizing a threshold vector with another threshold vector of the message recipient using a system parameter of the set of system parameters and the private key and encrypting a communication using the threshold vector and the synchronized base matrix pair.

In another embodiment, a system can be provided that has a processor and a memory that stores executable instructions, that when executed by the processor facilitate performance of operations. The operations include initializing a system parameter. The operations also include randomly generating a private key based on a Diffie-Hellman key exchange with a sending device. The operations also include generating a base matrix pair as a function of the private keys, wherein the base matrix pair is synchronized with the sending device and determining a threshold vector using the system parameter and the private key. The operations can also include a received message based on the threshold vector and the base matrix pair.

Multivariate crypytography ("MVC") is a kind of post-quantum cryptography algorithm where a one-way function takes the form of a set of quadratic polynomials. The scheme evolves from the idea of univariate modular equation $y=x^e$ mod p in RSA by either 1) replacing it with a small/moderate set of modular equations of low degree modulo a large number or 2) replacing a large set of modular equations of low degree modulo a small number. It starts from a set of quadratic equations, with some specific structure, e.g., $Y=F(X)$; $Y=(y_1, \ldots, y_k)$; $X=(x_1, \ldots, x_m)$; and hides the underlying structure manipulated by two linear (or affine) bijections matrices T, S. The public key is obtained by combing F, T and S, say $\phi=T \circ F \circ S$ and makes the solution of quadratic polynomials exits. For PKC, the encryption can use $0=T \circ F \circ s$ and the decryption involves solving the easy equations by means of known S, T. Typically, the easy equations can be in the form of $y_1=x_1 x_2$ mod p, where p is an RSA integer; $y_{i-1}=x_i \lambda_i(x_1, \ldots, x_{i-1})+\kappa_i(x_1, \ldots, x_{i-1})$ for $i=3, \ldots, k+1$ where $\lambda_i$ is linear; $\kappa_i$ is quadratic; and there is k equations with k+1 variables, the approach is by solving step by step from a chosen $x_1$.

FIG. 1 illustrates an example non-limiting schematic diagram 100 of a model of a neuron according to an aspect or embodiment of the subject disclosure.

As illustrated in FIG. 1, Hopfield neural networks are constructed with artificial neurons with n inputs and each input has a weight value. Output of each neuron is determined by the sum of all the weighted input. Let the current state of the i-th neuron denoted by $S_{i,t}$, the next state $S_{i,t+1}$, depends on the current states of other neurons and the synaptic weights as:

$$S_{i,t+1} = f\left(\sum_{j=1}^{n} \tau_{i,j} S_{j,t} + \vartheta_i\right), i = 1, 2, \ldots n \quad \text{Equation (1)}$$

where $\tau_{i,j}$ is the synaptic strength between neurons i and j, $\theta_i$ is the threshold value of the neuron i and $f(.)$ is any non-linear function. This equation is embodied in the diagram 100 shown in FIG. 1, where the artificial neurons at $S_{1,t}$ (102), $S_{2,t}$ (104), and $S_{3,t}$ (106) are summed at 108 and then a function f is applied at 110, resulting in $S_{i,t+1}$ at 112. Typically each neuron has two working states $S_{i,t}$, firing state represented by $S_{i,t}=1$ and quiescent state represented by $S_{i,t}=0$. Hence, in HNN, $f(.)$ could take form of a signum function defined by $$f(x) = \begin{cases} 1 & \text{if } x >= 0 \\ 0 & \text{if } x < 0. \end{cases}$$

According to Hebb's learning rule, the synaptic weights $\tau_{ij}$ could be any real number, which is not friendly to its physical implementations. The Clipped Hopfield Neural Network (CHNN) clipped the synaptic weights into three values $\{+1, 0, -1\}$ using Equation 2 shown below $$\tau_{ij} = \varphi(\tau_{ij}) \text{ and } \varphi(x) = \begin{cases} +1 & \text{if } x > 0 \\ 0 & \text{if } x = 0 \\ -1 & \text{if } x < 0 \end{cases} \quad \text{Equation (2)}$$

and explored its non-linear dynamics and convergence properties in a design of a keystream generator. CHNN can also be constructed using linear feedback shift sequences with a non-linear filter function, which is irreducible in the field of GF(p) and has been theoretically proved to be NP-complete in nature. In this disclosure, CHNN is extended to be better applied in our proposed algorithm. For the extended CHNN, synaptic matrix T is generated as any unimodular besides idempotent matrix and the non-linear function $f(.)$ takes the form of $$f(x) = \begin{cases} x \mod p & \text{if } x >= 0 \\ p - |x| \mod p & \text{if } x < 0 \end{cases}$$

where p is a large prime number, which means each neuron represents $(\lfloor \log_2 p \rfloor + 1)$ bit of information, where $\lfloor . \rfloor$ is the integer function.

When mapping from MVC to extended CHNN observing that $S_{i,t+1}$ could be represented in matrix form, as t increases, it could be regarded as an enhanced multivariate scheme of using a large set of modular equations of low degree modulo a large number, compared with the two conventional schemes mentioned earlier. The solving of equations using both iterative and polynomial forms can be possible. Thus, the extended CHNN could be well mapped into multivariate problems. Rewriting Equation 1:

$$S_{1,t+1} = f\left(\sum_{j=1}^{n} \tau_{1,j} S_{j,t} + \vartheta_1\right)$$

$$S_{2,t+1} = f\left(\sum_{j=1}^{n} \tau_{2,j} S_{j,t} + \vartheta_2\right)$$

$$\vdots$$

$$S_{n,t+1} = f\left(\sum_{j=1}^{n} \tau_{n,j} S_{j,t} + \vartheta_n\right)$$

which could be further reformulated as $$S_{t+1} = f(TS_t + \vartheta) \text{ where} \quad \text{Equation (3)}$$

$$S_t = \begin{bmatrix} S_{1,t} \\ S_{2,t} \\ \vdots \\ S_{n,t} \end{bmatrix}, \vartheta = \begin{bmatrix} \vartheta_1 \\ \vartheta_2 \\ \vdots \\ \vartheta_n \end{bmatrix}, T = \begin{bmatrix} \tau_{1,1} & \tau_{1,2} & \cdots & \tau_{1,n} \\ \tau_{2,1} & \tau_{2,2} & \cdots & \tau_{2,n} \\ \vdots & \vdots & \ddots & \vdots \\ \tau_{n,1} & \tau_{n,2} & \cdots & \tau_{n,n} \end{bmatrix}.$$

Synaptic matrix T can be an unimodular, which provides sufficient condition that the elements of its inverse $T^{-1}$ are all integers. This prerequisite secures the accuracy of the cryptosystem since the inverse matrix $T^{-1}$ will be iterated thousands of times in decryption stage on machines with limited precision. If the initial state of the network at t=0 is denoted as $S_0$ and let $f(.)$ function take the form of modulo operation, with the properties provided by the modulo arithmetic, such as $$f(af(b) + c) = [a(b \bmod p) + c] \bmod p$$
$$= (ab + c) \bmod p$$
$$= f(ab + c)$$

the state after $\rho$ times iterations can be derived as following:

$$S_1 = f(TS_0 + \vartheta)$$
$$S_2 = f(TS_1 + \vartheta) = f(Tf(TS_0 + \vartheta) + \vartheta) = f(T^2 S_0 + T\vartheta + \vartheta)$$
$$S_3 = f(TS_2 + \vartheta) =$$
$$\qquad f(Tf(T^2 S_0 + T\vartheta + \vartheta) + \vartheta) = f(T^3 S_0 + T^2 \vartheta + T\vartheta + \vartheta)$$
$$\vdots$$
$$S_\rho = f\left(T^\rho S_0 + \sum_{j=0}^{\rho-1} T^j \vartheta\right). \qquad \text{Equation (4)}$$

Evidently, the neural network reaches the state, i.e. $S_\rho = Y$, where Y is the solution for the multivariate polynomials represented by $T^\rho S_0 + \Sigma_{j=0}^{\rho-1} T^j \theta$ with the input variable matrix $$X = \begin{bmatrix} x_1 \\ x_2 \\ \vdots \\ x_n \end{bmatrix} = S_0 = \begin{bmatrix} S_{1,0} \\ S_{2,0} \\ \vdots \\ S_{n,0} \end{bmatrix}.$$

Equation (4) can be rewritten as multivariate polynomials in GF(p) as following $$Y = f\left(T^\rho S_0 + \sum_{j=0}^{\rho-1} T^j \vartheta\right) \qquad \text{Equation (5)}$$
$$= f(T_x X + T_\vartheta \vartheta)$$

where $$T_x = T^\rho \text{ and } T_\vartheta = \sum_{j=0}^{\rho-1} T^j.$$

From Equation (5), X can be obtained by:

$$X = f(T_x^{-1}(Y - f(T_\theta \theta))). \qquad \text{Equation (6):}$$

At this point, the mapping from the eCHNN to multivariate can be achieved.

In order to mitigate attacks due to the inverse properties of the Affine Matrix which can be found by either plaintext attacks or factorization attacks, random key pairs based on Diffie-Hellman-like key exchange can be generated. A method to obtain the shared threshold vector is described to enhance the security of the system As discussed above, multivariate cryptography could be well mapped with the extended Clipped Hopfield Neural Network. However, without any supplementary steps, any one could easily break the system since if T and θ are set as public, to calculate inverse $T^{-1}$ involves no hardness. Even though the iteration time ρ could be kept as private and transformed from one party to the other through a secret channel, the cryptosystem could be broken in a worst-case time proportional to ρ and an average time of half that using brute-force attack.

To address the problems mentioned above, the subject application discloses that both parties to generate a matrix pair $\{T_s, T_s'\}$, where $E \equiv T_s^\rho T_s'^\rho \bmod p$ and E is a n×n unit array, instead of applying matrix T directly in the encryption and decryption processes indicated by (5) and (6). The method adopts the basic idea of Diffie-Hellman key exchange scheme and extends it into matrix field. The subject application first gives a brief overview of Diffie-Hellman key exchange scheme and then present the details of our proposed key scheme.

Diffie-Hellman key exchange algorithm provides the basis of a variety of key agreement protocols. The scheme offers a way to generate a shared key between two parties, say Alice and Bob, even without any prior communication. The protocol simply goes as follows. 1. Alice and Bob firstly agree on the use of a large prime number p and integer g, which is a primitive of mod p. 2. Alice picks a large integer a then calculates and sends Bob $A = g^a \bmod p$. 3. Bob picks a large integer b then calculates and sends Alice $B = g^b \bmod p$. 4. Alice calculates $S_A = B^a \bmod p$ and Bob calculates $S_B = A^b \bmod p$ where $S_A = S_B$ for $(g^a)^b \bmod p = g^{ab} \bmod p = (g^b)^a \bmod p$.

It released cryptography from the need of a secure key distribution channel. Its security rests crucially on the difficulty of computing discrete logarithms in a finite field, namely Discrete Logarithms Problem (DLP). Diffie-Hellman key agreement algorithm could be easily extended to work with multi-parties in group communications. In disclosure herein, the DLP is introduced to a matrix field, which means given two n order matrices $T$, $T^\circ$ and a large prime number p, find an integer l such that $T^l \equiv T^\circ \bmod p$. With the agreement of the use of T, $T^{-1}$ and p, the approach to get $T_s$ and $T'_s$ could be described as following steps:

1. Alice picks a large integer a and sends Bob $$T_A = T^a \bmod p \qquad \text{Equation (7):}$$

$$T'_A = (T^{-1})^a \bmod p \qquad \text{Equation (8):}$$

2. Bob picks a large integer b and sends Alice $$T_B = T^b \bmod p \qquad \text{Equation (9):}$$

$$T'_B = (T^{-1})^b \bmod p \qquad \text{Equation (10):}$$

3. Alice calculates $$T_s = T_B^a \bmod p \qquad \text{Equation (11):}$$

$$T'_s = (T'_B)^a \bmod p \qquad \text{Equation (12):}$$

and Bob calculates $$T_s = T_A^b \bmod p \qquad \text{Equation (13):}$$

$$T'_s = (T'_A)^b \bmod p \qquad \text{Equation (14):}$$

where $T_s$ is used to encrypt while $T'_s$ is used to decrypt, and vice versa.

Since a shared matrix pair $\{T_s, T'_s\}$ can be obtained using schemes described above, here the disclosure describes the way to generate the threshold vector using $T_s$ as the base matrix. The schedule here exploits the properties of the multiplication of matrices. Alice and Bob firstly agree on the use of a mask vector $Q = (q_1, q_2, \ldots, q_n)$, which is randomly generated before any communication. To obtain the shared threshold vector, for Alice, the following steps are followed 1. randomly generates a set of vector $V_A = (\alpha_1, \alpha_2, \ldots, \alpha_u)$ of random length u, where $\alpha_i$ is an integer for i=1, 2, . . . , u, as her secret key and calculates the sum:

$$H_A = \sum_{i=1}^{u} T_s^{\alpha_i} \bmod p \qquad \text{Equation (15)}$$

2. If $H_A$ is a singular matrix, Alice should go back to step 1) to re-generate the private key $V_A$, otherwise calculate her public key using:

$$P_A = QH_A \bmod p \qquad \text{Equation (16):}$$

For Bob, the following steps are followed:

1. randomly generates a set of vector $V_B = (\beta_1, \beta_2, \ldots, \beta_v)$ of random length v, where $\beta_j$ is an integer for $j=1, 2, \ldots, v$, as his secret key and calculates the sum $$H_B = \sum_{j=1}^{v} T_s^{\beta_j} \bmod p \qquad \text{Equation (17)}$$

2. If $H_B$ is singular, Bob should go back to step 1) to re-generate the private key $V_B$, otherwise calculate his public key using $$P_B = QH_B \bmod p \qquad \text{Equation (18):}$$

Alice and Bob exchange $P_A$ and $P_B$ and keep $V_A$ and $V_B$ secretly. In order to get the shared threshold vector, Alice will calculate $$\vartheta_A = P_B H_A \bmod p \qquad \text{Equation (19)}$$

$$= Q \sum_{j=1}^{v} T_s^{\beta_j} \sum_{i=1}^{u} T_s^{\alpha_i} \bmod p$$

$$= Q \sum_{j=1}^{v} \sum_{i=1}^{u} T_s^{\beta_j + \alpha_i} \bmod p$$

and Bob will calculate $$\vartheta_B = P_A H_B \bmod p \qquad \text{Equation (20)}$$

$$= Q \sum_{i=1}^{u} T_s^{\alpha_i} \sum_{j=1}^{v} T_s^{\beta_j} \bmod p$$

$$= Q \sum_{i=1}^{u} \sum_{j=1}^{v} T_s^{\alpha_i + \beta_j} \bmod p$$

Here: $\vartheta_A = \vartheta_B = \vartheta^T$. Thus, these steps lead to an agreement on the $n \times 1$ threshold vector $d$ to be used in encryption and decryption between Alice and Bob.

With the key schedule stated in above, the shared matrix pair $\{T_s, T'_s\}$ and threshold vector are substituted in the neural cryptosystem, the encryption Equation (5) could be re-written as $$C = f\left(T_s^\rho M + \sum_{j=0}^{\rho-1} T_s^j \vartheta\right) \qquad \text{Equation (21)}$$

where M coded as $M = (m_1, m_2, \ldots, m_n)^T$ stands for the message to be sent from Alice to Bob, C is the cipher text. Alice then assembles message $(C, \rho)$ and sends it to Bob. After extraction of C and $\rho$, Bob decrypts to get M, extracting $$M = f\left(T_s^{\prime \rho}\left(C - f\left(\sum_{j=0}^{\rho-1} T_s^j \vartheta\right)\right)\right) \qquad \text{Equation (22)}$$

For the sake of simplicity but without loss of generality, small integers are used in examples herein instead of large ones. For $n=4$ and $p=23$ in GF(23) space, mask vector $Q=(22,5,12,3)$, unimodular T and $T^{-1}$ are given as $$T = \begin{bmatrix} 0 & -1 & -4 & -4 \\ 1 & 4 & -6 & 0 \\ -2 & -7 & -2 & -9 \\ 1 & 3 & -3 & 1 \end{bmatrix}$$

and $$T^{-1} = \begin{bmatrix} 4 & -1 & -2 & -2 \\ -13 & -4 & 8 & 20 \\ -8 & -3 & 5 & 13 \\ 11 & 4 & -7 & 18 \end{bmatrix},$$

Suppose Alice selects $a=55$ and $T_A$ and $T'_A$ could be calculated by using (7) and (8). Similarly, Bob chooses $b=69$ and computes $T_B$ and $T_B'$ using (9) and (10). Then Alice and Bob could synchronize a shared matrix pair $\{T_s, T'_s\}$ as the base matrix used to generate the threshold vector, where $$T_A \equiv T^{55} \equiv \begin{bmatrix} 10 & 3 & 18 & 6 \\ 0 & 22 & 20 & 3 \\ 8 & 7 & 12 & 21 \\ 16 & 14 & 11 & 10 \end{bmatrix} \bmod 23$$

$$T'_A \equiv T^{-155} \equiv \begin{bmatrix} 17 & 21 & 13 & 16 \\ 22 & 22 & 7 & 0 \\ 20 & 0 & 19 & 1 \\ 12 & 0 & 6 & 1 \end{bmatrix} \bmod 23$$

$$T_B \equiv T^{69} \equiv \begin{bmatrix} 5 & 15 & 20 & 2 \\ 22 & 22 & 3 & 9 \\ 19 & 9 & 13 & 1 \\ 10 & 11 & 8 & 6 \end{bmatrix} \bmod 23$$

$$T'_B \equiv T^{-169} \equiv \begin{bmatrix} 13 & 21 & 12 & 12 \\ 0 & 16 & 13 & 16 \\ 5 & 3 & 16 & 18 \\ 10 & 16 & 0 & 15 \end{bmatrix} \bmod 23$$

$$T_s \equiv \begin{bmatrix} 5 & 15 & 20 & 2 \\ 22 & 22 & 3 & 9 \\ 19 & 9 & 13 & 1 \\ 10 & 11 & 8 & 6 \end{bmatrix}^{55} \bmod 23$$

$$\equiv \begin{bmatrix} 10 & 3 & 18 & 6 \\ 0 & 22 & 20 & 3 \\ 8 & 7 & 12 & 21 \\ 16 & 14 & 11 & 10 \end{bmatrix}^{69} \bmod 23$$

$$\equiv \begin{bmatrix} 8 & 6 & 13 & 11 \\ 21 & 14 & 6 & 7 \\ 10 & 8 & 9 & 13 \\ 10 & 22 & 4 & 14 \end{bmatrix} \bmod 23$$

$$T'_s \equiv \begin{bmatrix} 13 & 21 & 12 & 12 \\ 0 & 16 & 13 & 16 \\ 5 & 3 & 16 & 18 \\ 10 & 16 & 0 & 15 \end{bmatrix}^{-55} \mod 23$$

$$\equiv \begin{bmatrix} 17 & 21 & 13 & 16 \\ 22 & 22 & 7 & 0 \\ 20 & 0 & 19 & 1 \\ 12 & 0 & 6 & 1 \end{bmatrix}^{69} \mod 23$$

$$\equiv \begin{bmatrix} 21 & 17 & 12 & 0 \\ 6 & 4 & 15 & 4 \\ 15 & 4 & 4 & 17 \\ 14 & 10 & 16 & 7 \end{bmatrix} \mod 23$$

Now that the base matrix pair $\{T_s, T'_s\}$ have been generated, Alice and Bob select $V_A=(11,2,13,4)$ and $V_B=(5,146,7,8,99)$ as their secret key respectively and the public keys could be obtained by substituting these parameters into Equations (16) and (18) resulting in $$P_A \equiv f(Q(T_s^{11} + T_s^2 + T_s^{13} + T_s^4))$$
$$\equiv \begin{bmatrix} 22 \\ 5 \\ 12 \\ 3 \end{bmatrix}^T \begin{bmatrix} 5 & 1 & 13 & 1 \\ 4 & 7 & 6 & 10 \\ 18 & 22 & 19 & 13 \\ 10 & 10 & 22 & 7 \end{bmatrix} \mod 23$$
$$\equiv [8 \quad 6 \quad 12 \quad 19] \mod 23$$

$$P_B \equiv f(Q(T_s^5 + T_s^{146} + T_s^7 + T_s^8 + T_s^{99}))$$
$$\equiv \begin{bmatrix} 22 \\ 5 \\ 12 \\ 3 \end{bmatrix}^T \begin{bmatrix} 11 & 17 & 5 & 8 \\ 16 & 7 & 16 & 11 \\ 11 & 11 & 17 & 7 \\ 10 & 16 & 1 & 22 \end{bmatrix} \mod 23$$
$$\equiv [1 \quad 4 \quad 6 \quad 13] \mod 23$$

Then the shared vector could be calculated as using Equations (19) and (20) by Alice and Bob respectively as $$\vartheta_A \equiv \begin{bmatrix} 1 \\ 4 \\ 6 \\ 13 \end{bmatrix}^T \begin{bmatrix} 5 & 1 & 13 & 1 \\ 4 & 7 & 6 & 10 \\ 18 & 22 & 19 & 13 \\ 10 & 10 & 22 & 7 \end{bmatrix} \mod 23$$
$$\equiv [0 \quad 16 \quad 14 \quad 11] \mod 23$$

$$\vartheta_B \equiv \begin{bmatrix} 8 \\ 6 \\ 12 \\ 19 \end{bmatrix}^T \begin{bmatrix} 11 & 17 & 5 & 8 \\ 16 & 7 & 16 & 11 \\ 11 & 11 & 17 & 7 \\ 10 & 16 & 1 & 22 \end{bmatrix} \mod 23$$
$$\equiv [0 \quad 16 \quad 14 \quad 11] \mod 23$$

Let $M=(11,16,3,7)^T$ and $\rho=600$, Alice calculates $C=(4,11,19,14)^T$ using (21) and sends Bob $(4,11,19,14,600)$. Bob then decrypts using (22) and gets $M=(11,16,3,7)^T$ The above process for encryption and decryption is shown in the flowcharts in FIGS. 2A and 2B, which illustrate exemplary non-limiting schematic diagrams 200 and 210 of a cryptosystem flow according to an aspect or embodiment of the subject disclosure.

Figure 2A:
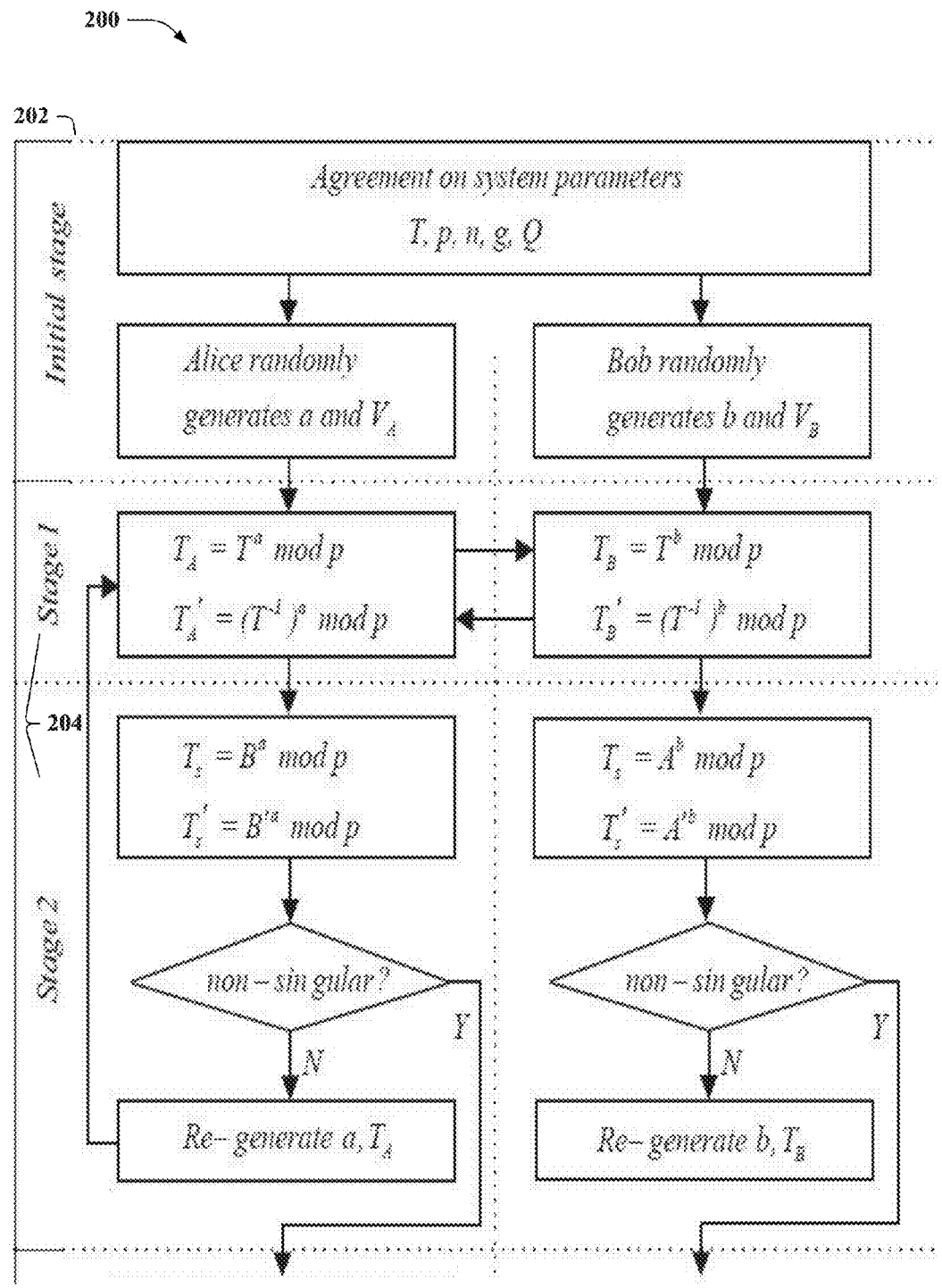
FIGS. 2A and 2B are exemplary non-limiting schematic diagrams of a cryptosystem flow according to an aspect or embodiment of the subject disclosure.
Figure 2B:
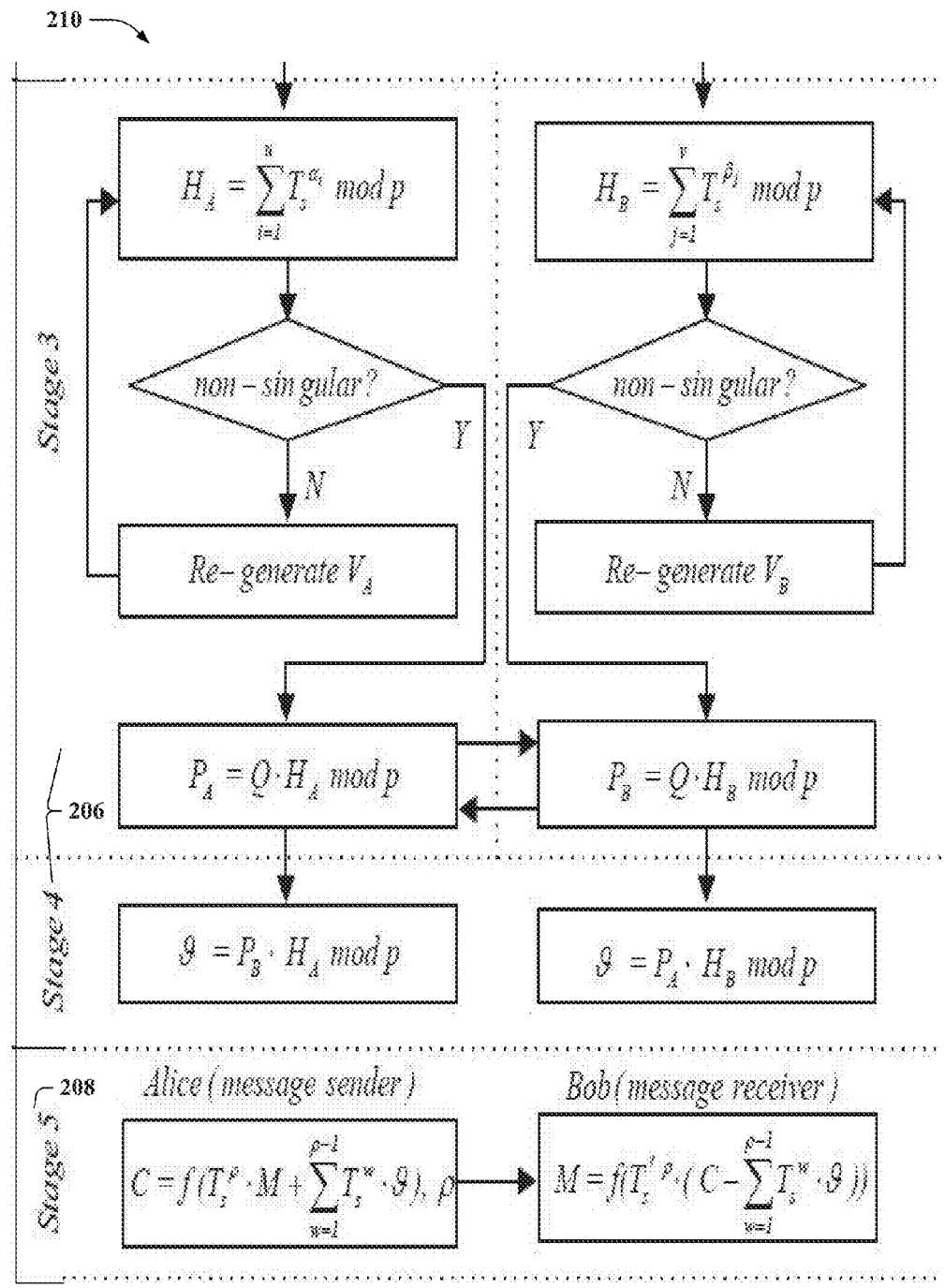

As shown in FIGS. 2A and 2B, several stages are involved in the communication which could be classified into three stages, the initial stage 202, the synchronization stage 204 and 206 and the encryption/decryption stage 208. In the initial stage 202, system parameters including n, p, T and Q are agreed and private keys $\{a, V_A\}$ and $\{b, V_B\}$ are randomly generated by Alice and Bob respectively. In the synchronization stages, the base matrix pair $\{T_s, T'_s\}$ (204) and the threshold vector $\theta$ (206) are obtained using schemes described above. Hence, the two sides Alice and Bob could use them to communicate, illustrated as the encryption/decryption stage 208 in FIG. 2B. Initialization and synchronization can be done only once before the first communication of two parties. In order to obtain higher security, the iteration time $\rho$ can be kept as a variable for different sessions.

Figure 3:
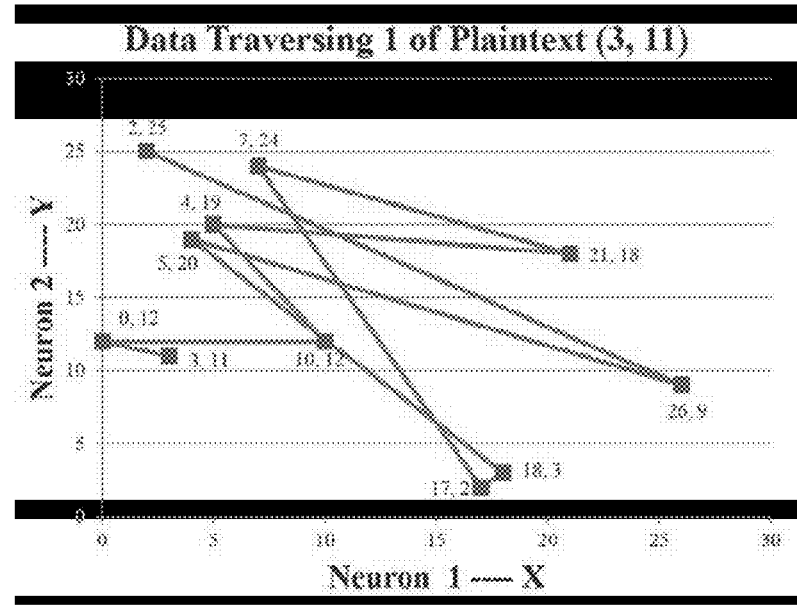
FIG. 3 is an example non-limiting graph showing sensitivity to plaintext and key for data traversing a cryptosystem according to an aspect or embodiment of the subject disclosure.
Figure 4:
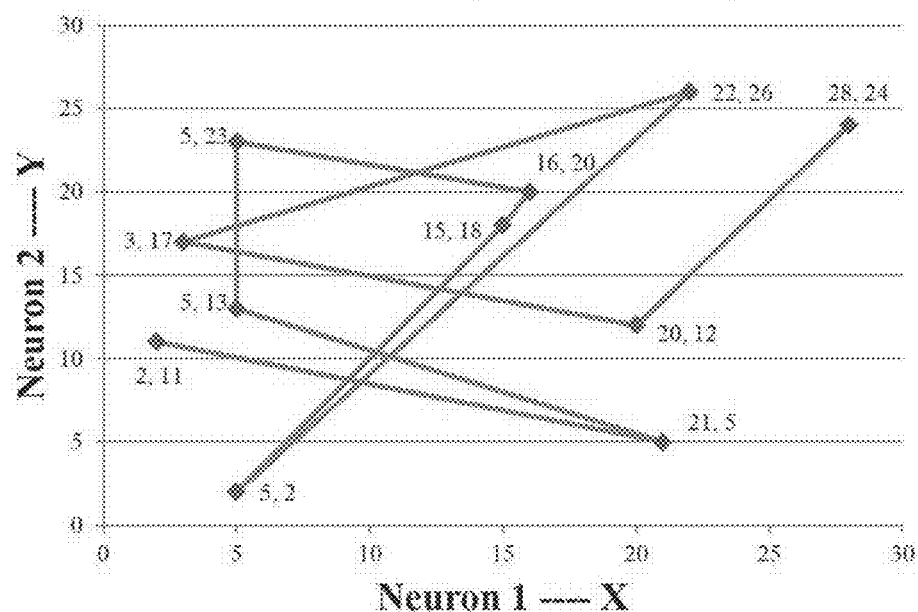
FIG. 4 is an example non-limiting graph showing sensitivity to plaintext and key for data traversing a cryptosystem according to an aspect or embodiment of the subject disclosure.
Figure 5:
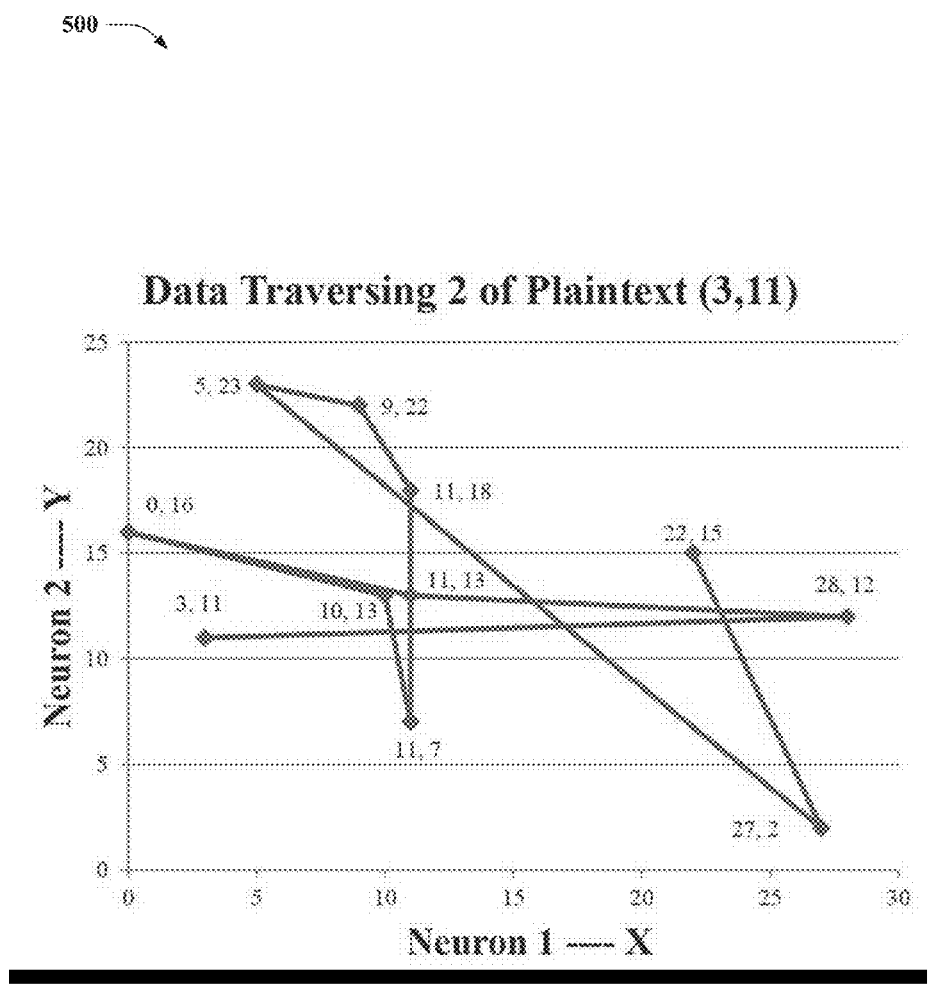
FIG. 5 is an example non-limiting graph showing sensitivity to plaintext and key for data traversing a cryptosystem according to an aspect or embodiment of the subject disclosure.
Figure 6:
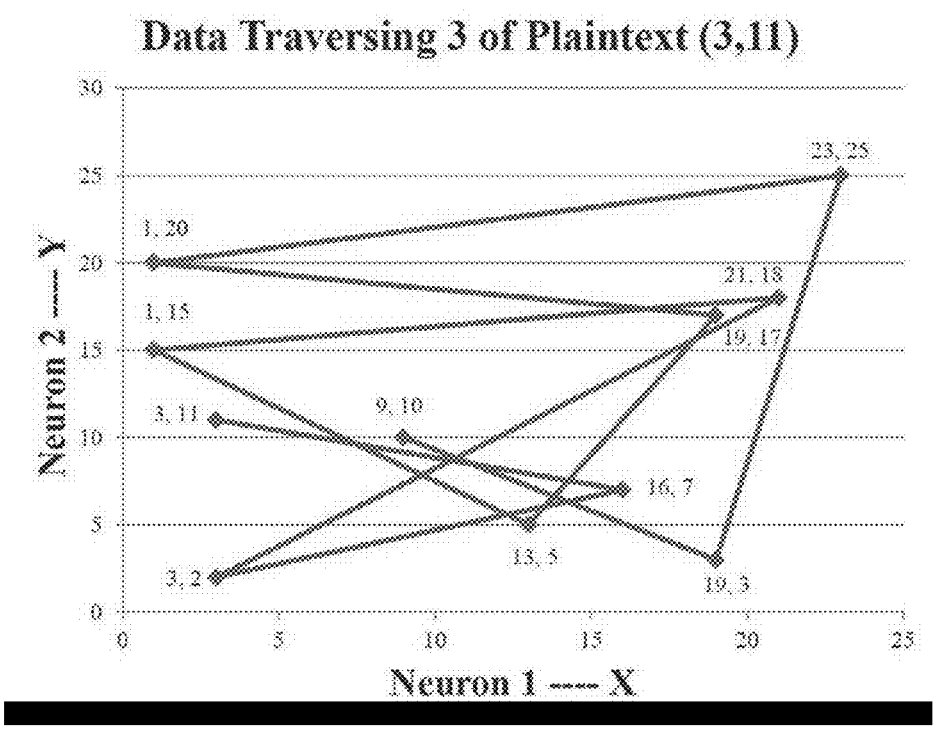
FIG. 6 is an example non-limiting graph showing sensitivity to plaintext and key for data traversing a cryptosystem according to an aspect or embodiment of the subject disclosure.

From the security standpoint, a reliable cryptosystem should be designed with high sensitivity to the key and the plaintext. In order to obtain more visualized details, two plaintexts represented by (x,y) can be traversed and keys with slightly difference in a CHNN-MVC of two nodes, which are numbered as neuron 1 for x and neuron 2 for y. The output results with different values of $\rho$ then could be traversed and described as points in a X-Y coordinate. As depicted in FIG. 3 and FIG. 4, the results changed dramatically with slight difference added into plaintext by transforming (3, 11) to (2, 11). Small changes of the key vector by transforming $V_A=(11,2,13,4)$ to $V_A=(11,2,13,4,1)$ also leads to tremendous differences in the output, as illustrated in FIG. 3 and FIG. 5. Similarly, a small change of one party's secret iteration number by transforming b=11 to b=13 gives entirely different results as illustrated in FIG. 3 and FIG. 6. It shows high level of sensitivity to plaintext, key and iteration number of our scheme FIG. 3 depicts data traversing 1 of Plaintext (3,11) with Q=(12,17), a=17, b=11, $V_A=(11,2,13,4)$, $V_B=(5,1,7,8,19)$, $\rho$ from 10 to 19; FIG. 4 depicts data traversing of Paintext (2,11) with Q=(12,17), a=17, b=11, $V_A=(11,2,13,4)$, $V_B=(5,1,7,8,19)$, $\rho$ from 10 to 19; FIG. 5 depicts data traversing 2 of Plaintext (3,11) with Q=(12,17), a=17, b=11, $V_A=(11,2,13,4,1)$, $V_B=(5,1,7,8,19)$, $\rho$ from 10 to 19; while FIG. 6 depicts data traversing 3 of Plaintext (3,11) with Q=(12,17), a=17, b=13, $V_A=(11,2,13,4)$, $V_B=(5,1,7,8,19)$, p from 10 to 19.

Compared with traditional algorithms, vectors and matrixes instead of single data are used as keys in our scheme, which means the output comes as a combination of the effect of multiple data by means of matrix multiplication and due to the system's high sensitivity to the key, to break the system, one need to hit all the elements of the matrix correctly at the same time and namely the cryptography is multi-dimensional. Accordingly, potential attacks on it are analyzed to show its strong security. The following depicts exemplary proposed attacks on the disclosed eCHNN encryption scheme.

One possible way to attack the proposed DH-like matrix exchange algorithm is by applying matrix decomposition. As introduced in Section 3.1, T is set as public, given $T_A$ (or $T_B$), the analyser may try to factorize T to obtain its power expression to get the exponent a (or b). The most likely factorizing method is the eigendecomposition, which will decompose matrix T into the product of $PDP^{-1}$, where D is a diagonal matrix formed by the distinct eigenvalues of T and P is the matrix generated using the corresponding eigenvectors of T as its columns. For the sake of simplicity, consider T as a 2×2 matrix and suppose $$T_A = \begin{bmatrix} t_1 & t_2 \\ t_3 & t_4 \end{bmatrix}, D = \begin{bmatrix} \lambda_1 & 0 \\ 0 & \lambda_2 \end{bmatrix},$$

$$P = \begin{bmatrix} \eta_1 & \eta_2 \\ \eta_3 & \eta_4 \end{bmatrix}, P^{-1} = \begin{bmatrix} \eta'_1 & \eta'_2 \\ \eta'_3 & \eta'_4 \end{bmatrix}$$

where $\lambda_1$ and $\lambda_2$ are the two distinct eigenvalues of matrix T. Apparently, there's $$\begin{cases} \eta_1 \eta'_1 + \eta_2 \eta'_3 = 1, \\ \eta_1 \eta'_2 + \eta_2 \eta'_4 = 0, \\ \eta_3 \eta'_1 + \eta_4 \eta'_3 = 0, \\ \eta_3 \eta'_2 + \eta_4 \eta'_4 = 1. \end{cases} \quad \text{Equation (23)}$$

Since $T = PDP^{-1}$ and as defined in Section 3.1 $T_A \equiv T^a \mod p$, the following pertains $$T^a = (PDP^{-1})^a \quad \text{Equation (24)}$$
$$= (PDP^{-1})(PDP^{-1}) \ldots (PDP^{-1})$$
$$= PD^a P^{-1}$$

which could be further developed as $$T_A = \begin{bmatrix} \eta_1 & \eta_2 \\ \eta_3 & \eta_4 \end{bmatrix} \begin{bmatrix} \lambda_1 & 0 \\ 0 & \lambda_2 \end{bmatrix}^a \begin{bmatrix} \eta'_1 & \eta'_2 \\ \eta'_3 & \eta'_4 \end{bmatrix} \mod p$$

With the expansion of Equation (24) and substitutions of Equation (23), to break the DH-like matrix exchange algorithm is equivalent to solve a from the following equations:

$$\begin{cases} t_1 \equiv \eta_1 \eta'_1 \lambda_1^a + (1 - \eta_1 \eta'_1) \lambda_2^a \mod p, \\ t_2 \equiv \eta_1 \eta'_2 \lambda_1^a - \eta_1 \eta'_2 \lambda_2^a \mod p, \\ t_3 \equiv \eta_3 \eta'_1 \lambda_1^a - \eta_3 \eta'_1 \lambda_2^a \mod p, \\ t_4 \equiv \eta_3 \eta'_2 \lambda_1^a + (1 - \eta_3 \eta'_2) \lambda_2^a \mod p. \end{cases}$$

This is much harder than solving general discrete logarithms even it is worked with quantum computers because the exponent a has to satisfy multiple discrete logarithm equations with multiple bases at the same time. Worse still, for the reason of the limited machine precision and with a large integer a, truncation error will lead the solution into uncontrollable status since the distinct eigenvalues are more likely to be decimals than integers. Consequently, the proposed DH-like matrix exchange algorithm disclosed herein is secure against attacks of matrix decompositions.

Another possible way to attack the proposed DH-like matrix exchange algorithm is by a one way function attack. The one way function in Section 3.2 is defined as given two row vectors of length n, Q and V, find a non-singular matrix $T^*$ such that $QT^* \equiv V \mod p$. Explicitly $H_A$ is a solution of $QT^* \equiv P_A \mod p$ and $H_B$ is a solution of $QT^* \equiv P_B \mod p$. To derive secret keys $H_A$ and $H_B$ from public keys $P_A$ and $P_B$ is equivalent to determine a specific matrix which satisfies the equation. Suppose $$V = (v_1, v_2, \ldots, v_n)$$

and $$T^* = \begin{bmatrix} \gamma_{11} & \gamma_{21} & \cdots & \gamma_{n1} \\ \gamma_{12} & \gamma_{22} & \cdots & \gamma_{n2} \\ \vdots & \vdots & \vdots & \vdots \\ \gamma_{1n} & \gamma_{2n} & \cdots & \gamma_{nm} \end{bmatrix}$$

where $v_i$ and $\gamma_{ij}$ are all primitives of GF(p), for i, j=1, 2, ..., n, the problem could be turned to find solutions of the equation set in terms of modulo p, as illustrated in the following equation $$\begin{bmatrix} q_1 \\ q_2 \\ \vdots \\ q_n \end{bmatrix}^T \begin{bmatrix} \gamma_{11} & \cdots & \gamma_{n1} \\ \gamma_{12} & \cdots & \gamma_{n2} \\ \vdots & \vdots & \vdots \\ \gamma_{1n} & \cdots & \gamma_{nm} \end{bmatrix} = f\left( \begin{bmatrix} v_1 \\ v_2 \\ \vdots \\ v_n \end{bmatrix}^T \right)$$

which could be rewritten as $$\begin{cases} \sum_{i=1}^{n} q_i \gamma_{1i} \equiv v_1 \mod p, \\ \sum_{i=1}^{n} q_i \gamma_{2i} \equiv v_2 \mod p, \\ \vdots \\ \sum_{i=1}^{n} q_i \gamma_{ni} \equiv v_n \mod p. \end{cases} \quad \text{Equation (25)}$$

The Key space of Equation (25) is approximately infinite as p is chosen as an RSA integer. Consequently, the schemed disclosed herein could be secure against such one way function attacks.

Since CHNN is based on permuting their indices and in fact $\tilde{T}$ is obtained by conjugating T with the permutation P, i.e., the first the rows of T are permuted according to P and then the elements of each row are permuted according to P. Such an operation will not change the static structure of the network. The output of the permuted network can be identical to the result obtained by permuting the input to the regular network according to P and then permuting the network output according to the inverse of P, which is a faster cryptoanalysis procedure than permuting the network itself. This function of the network is just a nonlinear mapping and thus cipher only attack can break the system. This cryptanalysis approach is also valid for static Affine Matrices used in MVC systems.

With the introduction of the DH like key protocol into the MVC based CHNN cryptosystem, the static structure becoming dynamic and the mapping now becomes non-linear by selecting a non-singular key generation matrices $H_A$ and $H_B$. Thus, the Cipher Only Attack can be mitigated.

Affine matrices used in MVC systems can be singular, and by knowing the public key matrix and substituting a known plaintext into the key equations, a new matrix M can be obtained which can then be used to find the uniquely inversion of the matrix M and thus the private key matrix. By introducing a non-singular key generation matrices $H_A$ and $H_B$, the key pair matrices are no longer singular and thus the mapping becomes non-linear and thus, the known Plaintext Attack can be mitigated.

Since the proposed CHNN cryptosystem mapping directly into a Multivariate Cryptographic System, the NP hardness properties of the system will be preserved. For a n-neuron CHNN, the number of attractors selected as coded plaintext is P and the number of coding matrices will be P!, and for any given coding matrix. The key space will be n!. No simple known plaintext attack and key matrix factorization or decomposition can applied and an exhaustive search will need over n! number of search for unveiling the key pairs. In addition the scheme used to generate the threshold vector extremely extends the key space as illustrated by the following discussion. Due to the nature of mod operation, repetitive feature exits in $T^\rho$ mod p. Let the repetitive period denoted as $\Delta$, the characteristic could be described as $$T^\rho \bmod p = T^{\rho+\Delta} \bmod p$$

which equivalents to $$T^\Delta \bmod p = E \bmod p \qquad \text{Equation (26):}$$

Evidently, space of $T_s$, indicated as $\Theta(T,\Delta,p)$ crucially rests with value of $\Delta$, since $$T_s \bmod p = T^{ab \bmod \Delta} \bmod p. \qquad \text{Equation (27):}$$

Hence, there will be $$\Theta = T \bmod p, T^2 \bmod p, \ldots, T^\Delta \bmod p.$$

In order to give one possible way to derive $\Delta$, the characteristic equation $t(s)$ of the n×n unimodular matrix T can be considered. For any polynomial $P(s)$, there is $$P(s) = q(s)t(s) + r(s) \qquad \text{Equation (28):}$$

where $q(s)$ could be found by long division and the degree of the remainder polynomial $r(s)$ is not larger than n−1. With the eigenvalues of matrix T given as $\lambda_1, \lambda_2, \ldots \lambda_n$, definitely $t(\lambda_i) = 0$, for i=1, 2, . . . , n. According to the Cayley-Hamilton theorem [28], an n×n matrix satisfies its characteristic equation, i.e. $t(T) = 0$. In consequence, the order of a polynomial in T could be reduced using $$P(T) = q(T)t(T) + r(T) = r(T)$$

Let $P(T) = T^\Delta$, the following equation can be obtained from above $$T^\Delta = r(T) = r_0 E + \sum_{i=1}^{n-1} r_i T^i. \qquad \text{Equation (29)}$$

Equation (26) could be converted into $n^2$ equations $$\begin{cases} \sum_{i=1}^{n-1} r_i \tau_{\alpha\beta,\alpha\neq\beta}^{(i)} = k_{\alpha\beta} p, \\ \sum_{i=1}^{n-1} r_i \tau_{\alpha\alpha}^{(i)} + r_0 = k_{\alpha\alpha} p + 1 \end{cases} \qquad \text{Equation (30)}$$

where $\tau^{(i)}_{\alpha\beta}$ denotes the $(\alpha,\beta)$ element of matrix $T^i$ mod p, $k_{\alpha\beta}$ is any integer for $\alpha,\beta=1, 2, \ldots, n$ and $r_i$ for i=0, 1, . . . , n−1 could be obtained by solving the n linear equations in n unknowns $$\lambda_j^\Delta = r_0 + \sum_{i=1}^{n-1} r_i \lambda_j^i \qquad \text{Equation (31)}$$

for j=1, 2, . . . , n. $\Delta$ could be found by solving (30) and (31) simultaneously with traversing all possible values of $k_{\alpha\beta}$.

For simplicity if n=2 the problem turns to $$\begin{cases} r_1 \tau_{11} + r_0 = k_{11} p + 1, \\ r_1 \tau_{12} = k_{12} p, \\ r_1 \tau_{21} = k_{21} p, \\ r_1 \tau_{22} + r_0 = k_{22} p + 1. \end{cases}$$

where $$\begin{cases} r_0 = \dfrac{\lambda_1 \lambda_2^\Delta - \lambda_2 \lambda_1^\Delta}{\lambda_1 - \lambda_2}, \\ r_1 = \dfrac{\lambda_1^\Delta - \lambda_2^\Delta}{\lambda_1 - \lambda_2}. \end{cases}$$

Therefore, $\lambda_1^\Delta$ and $\lambda_2^\Delta$ can be obtained as the following polynomials $$\begin{cases} \lambda_1^\Delta = k_{22} p + 1 + \dfrac{k_{12}}{\tau_{12}}(\lambda_1 - \tau_{22})p, \\ \lambda_1^\Delta = k_{22} p + 1 + \dfrac{k_{21}}{\tau_{21}}(\lambda_1 - \tau_{22})p, \\ \lambda_2^\Delta = k_{11} p + 1 + \dfrac{k_{12}}{\tau_{12}}(\lambda_2 - \tau_{11})p, \\ \lambda_2^\Delta = k_{11} p + 1 + \dfrac{k_{21}}{\tau_{21}}(\lambda_2 - \tau_{11})p. \end{cases}$$

Suppose $k_{12} = \tau_{12} k'$ and $k_{21} = \tau_{21} k'$, $\Delta$ could be solved as $$\begin{cases} \Delta = \log_{\lambda_1} k_{22} p + 1 + k'(\lambda_1 - \tau_{22})p, \\ \Delta = \log_{\lambda_2} k_{11} p + 1 + k'(\lambda_2 - \tau_{11})p. \end{cases} \qquad \text{Equation (32)}$$

For the method of exhaustion, $k_{22}$, k' and $k_{11}$ would be traversed in the integer field simultaneously to find all the possible solutions of each equation. Specifically, for p=7 and T is given as $$T = \begin{bmatrix} 5 & -4 \\ -6 & 5 \end{bmatrix}$$

the eigenvalues could be calculated as $$\lambda_1 = 5 + \sqrt{6}, \lambda_2 = 5 - \sqrt{6}.$$

When $k_{11} = k_{22} = 6585600$ and k'=2688560, (32) has solution $\Delta = 8$. The computation of $\Delta$ becomes extremely complex, time and memory consuming when n gets larger since more $k_{\alpha\beta}$ will be traversed in one equation. In addition, due to the issue of machine precision, the feasibility to calculate $\Delta$ applying Cayley Hamilton theorem is likely to be minimal. The main purpose of the derivation above is just show one way to estimate the space of $T_s$.

Let the repetitive period of the shared matrix $T_s$ represented by $\Delta'$ and its relationship with $\Delta$ could be derived as following. Since there's $T_s^{\rho+\Delta'} \bmod p = T_s^\rho \bmod p$, let $\rho' = ab \bmod p$, with Equation (27), it can be rewritten as $T^{\rho'(\rho+\Delta')} \bmod p = T^{\rho'\rho} \bmod p$.

Clearly, then ρ'A'=0 mod Δ, which could be further solved as $$\Delta' = \frac{k}{\rho'}\Delta,$$

where k is the smallest positive integer that ensures A' an integer. Therefore, the repetitive period of $T_s$ satisfies $$\Delta' = \frac{\Delta}{gcd(\Delta, \rho')}.$$

where gcd(Δ,ρ') denotes the greatest common divisor of Δ and ρ'.

At this point, it can be seen that there exists the probability of reduction of space of $T_s^p$ mod p compared with Δ, when gcd(Δ,ρ')≠1, which is undesirable. However, this problem can be easily mitigated simply by changing the modulus p used in Section 3.2 slightly into p'. Some experimental results of Δ and Δ' of different neuron networks are given in Table 0, which shows high efficiency of this measure and indicates A and A' could be much larger than $n^2$. With the upper limit of μ and ν restricted as ε, even if $T_s$ has been successfully analyzed, the space of the key matrix $H_A$ (or $H_B$) represented by Ω could be calculated as the sum of all possible combinations of the Δ values with repetition [5] as following:

$$\Omega = \sum_{i=1}^{\varepsilon} \binom{\Delta' + i - 1}{i} \quad \text{Equation (33)}$$

Next, if ε is set as n, there is $$\Omega \gg \binom{\Delta' + \varepsilon - 1}{\varepsilon} \gg \binom{n^2 + n - 1}{n} \gg n^n \gg n!$$

A proof of this property is given in Appendix A. Considering that the maximum amount of matrices of order n defined in the finite field GF(p) is $p^{n^2}$, the brute force searching space of $H_A$ (or $H_B$) will be min $(\Omega, p^{n^2})$ even if $T_s$ is broken, using scheme described in Section 3.2. If a dedicated computer system that can perform a search of $10^6$ groups of random permutations of keys in one second, the time required to search exhaustively the entire private key space and to identify private key is dependent on the size of n; for n=32 more than $10^{35}$ MIPS years would be required for a successful search, which is well above the acceptable security level of current states, i.e., $10^{12}$ MIPS years.

Figure 7:
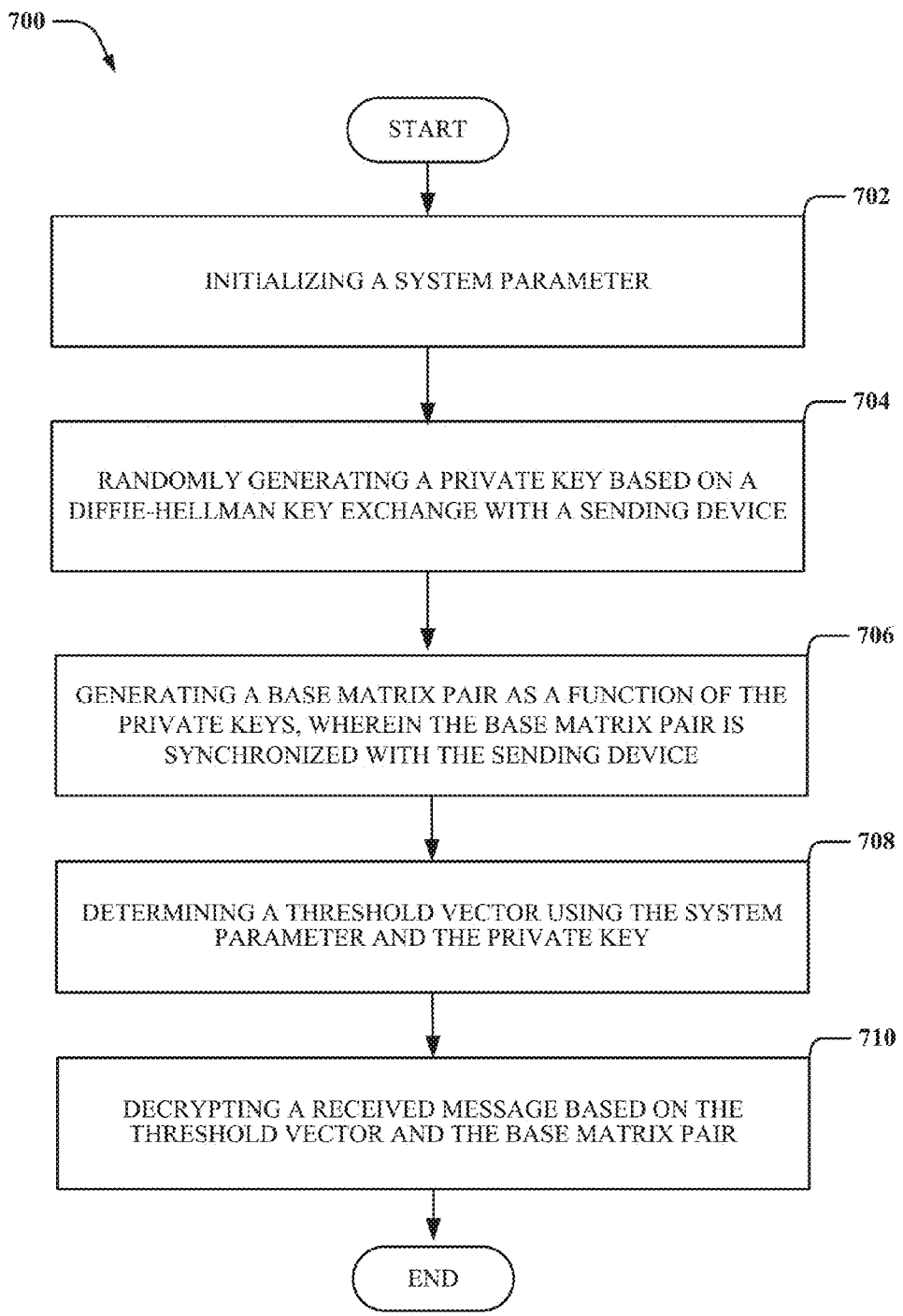
FIG. 7 is an example non-limiting process flow diagram of a cryptosystem method according to an aspect or embodiment of the subject disclosure.

FIG. 7 is an example non-limiting process flow diagram of a method 700 that encrypts communications based on a cryptosystem method, according to an aspect or embodiment of the subject disclosure. For simplicity of explanation, the methods (or procedures) are depicted and described as a series of acts. It is noted that the various embodiments are not limited by the acts illustrated and/or by the order of acts. For example, acts can occur in various orders and/or concurrently, and with other acts not presented or described herein. In another aspect, the various acts can be performed by systems and/or components of embodiments described herein.

Method 700 can begin at 702, where the method includes initializing a system parameter. At step 704, the method can include randomly generating a private key based on a Diffie-Hellman key exchange with a sending device.

At 706, the method can include generating a base matrix pair as a function of the private keys, wherein the base matrix pair is synchronized with the sending device. While at 708, the method can include determining a threshold vector using the system parameter and the private key.

At 710, the method can include decrypting a received message based on the threshold vector and the base matrix pair.

Figure 8:
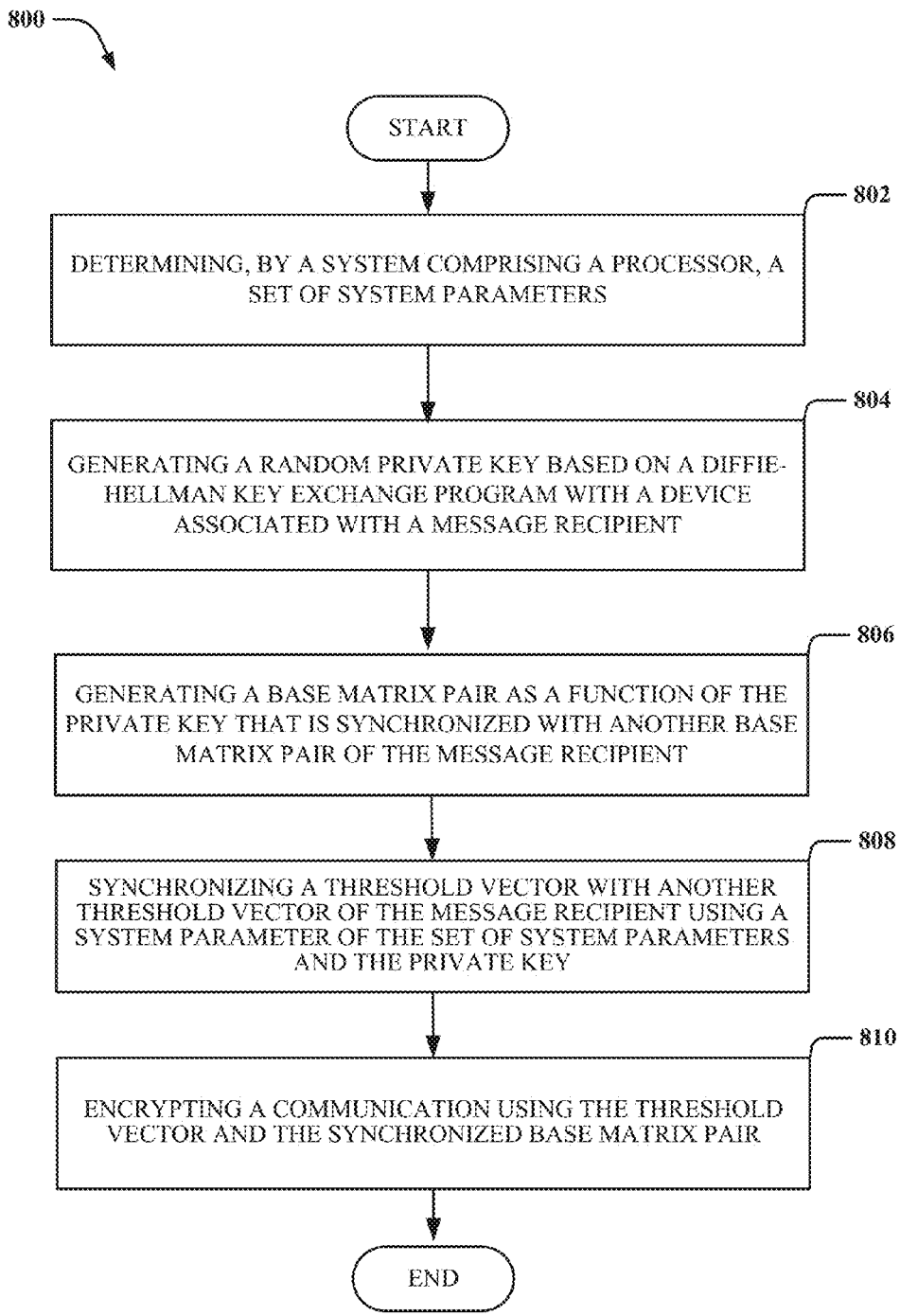
FIG. 8 is an example non-limiting process flow diagram of a cryptosystem method according to an aspect or embodiment of the subject disclosure.

Turning now to FIG. 8, illustrated is an example non-limiting process flow diagram of a cryptosystem method 800 according to an aspect or embodiment of the subject disclosure. Method 800 can start at 802 where the method comprises determining, by a system comprising a processor, a set of system parameters. At 804, the method can include generating a random private key based on a Diffie-Hellman key exchange program with a device associated with a message recipient. At 806 the method can include generating a base matrix pair as a function of the private key that is synchronized with another base matrix pair of the message recipient. At 808, the method can include synchronizing a threshold vector with another threshold vector of the message recipient using a system parameter of the set of system parameters and the private key while at 810 the method can include encrypting a communication using the threshold vector and the synchronized base matrix pair.

Figure 9:
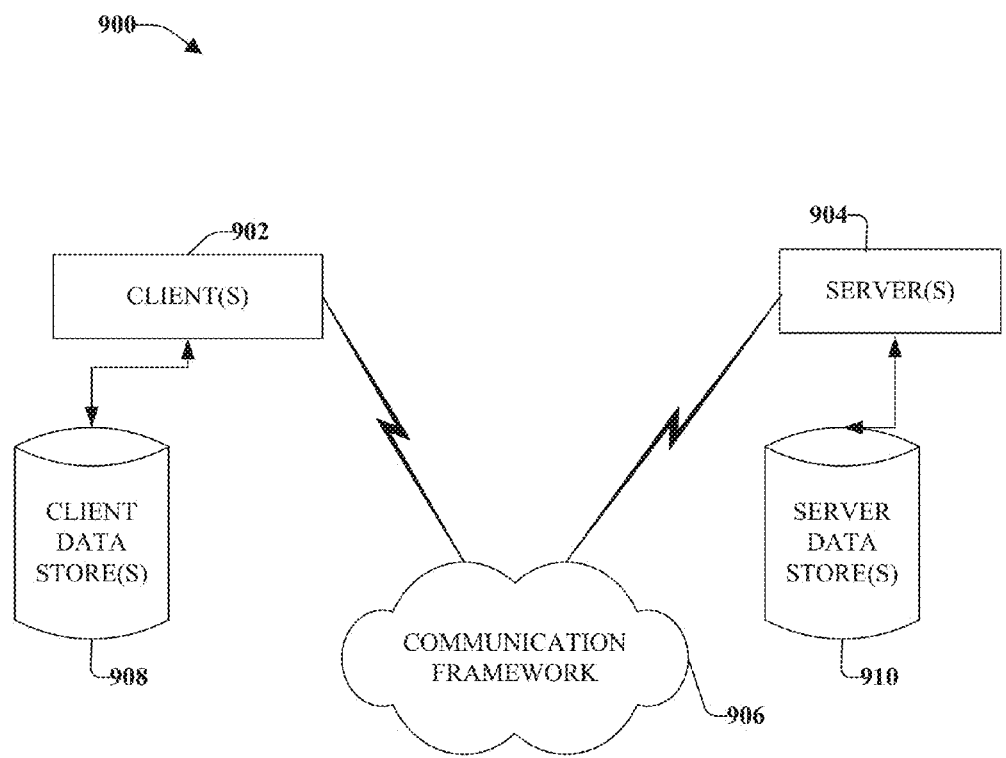
FIG. 9 illustrates an example schematic block diagram of a computing environment in accordance various aspects of this disclosure.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform transformations by employing aspects of this disclosure, for example. One possible communication between a client 902 and a server 904 can be in the form of a data packet adapted to be transmitted between two or more computer processes wherein data packets may include coded items. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. In an aspect, communications between client(s) 902 and network devices (e.g., server(s) 904) are through wireless channels. In another aspect, communication links between network devices (e.g., servers(s) 904) can be via wireless and/or wired channels. It is noted that wireless connections between client(s) 902 and network devices (e.g., server(s) 904) are described herein, however client(s) 902 may have other capabilities (e.g., wired communications capabilities). The client(s) 902 are operatively connected to one or more client data store(s) 908 that can be employed to store information local to the client(s) 902 (e.g., cookie(s) and/or associated contextual information). Similarly, the server(s)

904 are operatively connected to one or more server data store(s) 910 that can be employed to store information local to the servers 904.

In one implementation, a server 904 can transfer an encoded file, (e.g., network selection policy, network condition information, etc.), to client 902. Client 902 can store the file, decode the file, or transmit the file to another client 902. It is noted, that a server 904 can also transfer uncompressed file to a client 902 and client 902 can compress the file in accordance with the disclosed subject matter. Likewise, server 904 can encode information and transmit the information via communication framework 906 to one or more clients 902.

Figure 10:
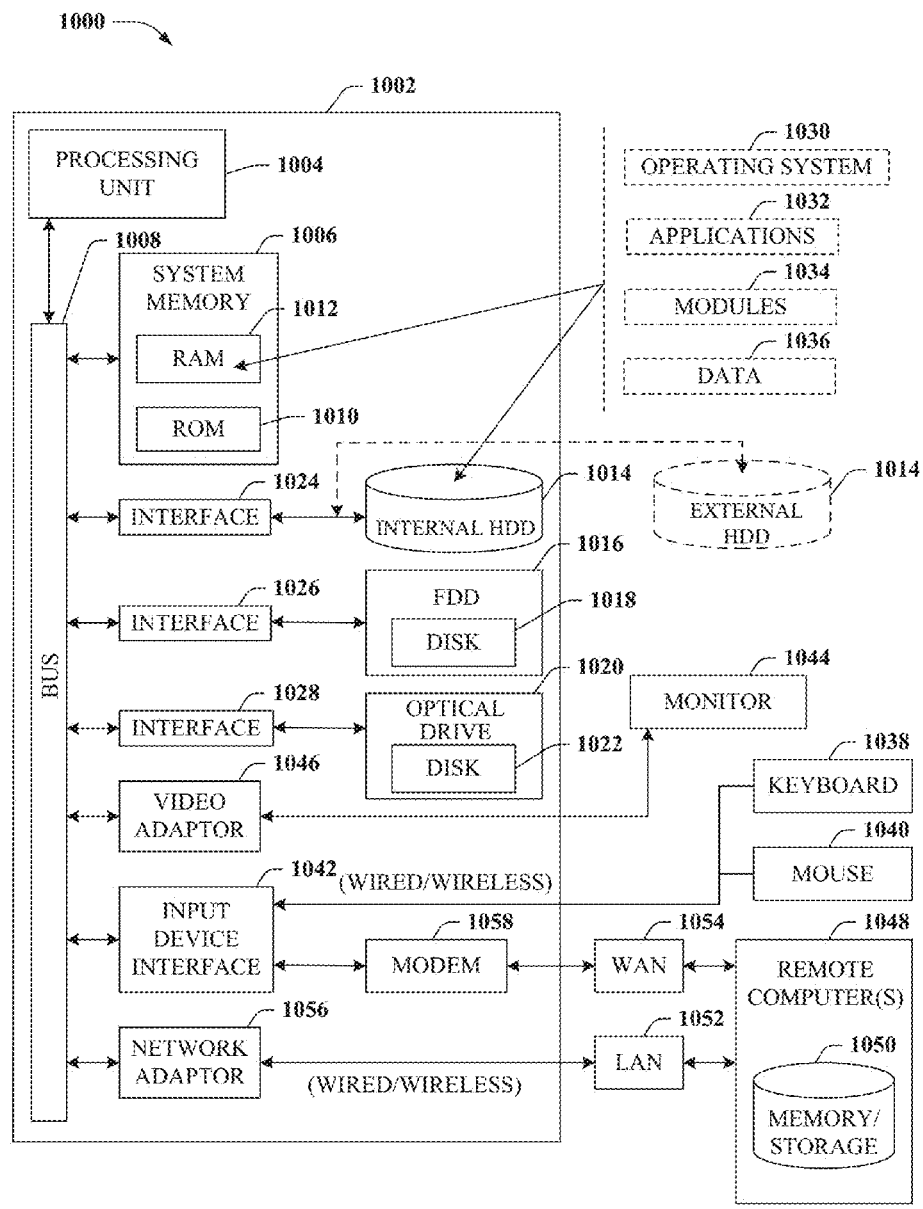
FIG. 10 illustrates a block diagram of a computer operable to execute the disclosed communication architecture.

Referring now to FIG. 10, there is illustrated a block diagram of a computer operable to execute the disclosed communication architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, it is noted that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices.

The illustrated aspects of the specification can also be practiced in distributed computing environments, including cloud-computing environments, where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically include (and/or facilitate the transmission of) computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system is stored in a non-volatile memory 1010 such as ROM, erasable programmable read only memory, electrically erasable programmable read only memory, which basic input/output system contains the basic routines that help to transfer information between elements within the computer 1002, such as during startup. The RAM 1012 can also include a high-speed RAM such as static RAM for caching data.

The computer 1002 further includes an internal hard disk drive 1014 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network 1052 and/or larger networks, e.g., a wide area network 1054. Such local area network and wide area network networking environments are commonplace in offices and companies, and facilitate enterprise-wide computer networks, such as intranets, all of which can connect to a global communications network, e.g., the Internet.

When used in a local area network networking environment, the computer 1002 is connected to the local network 1052 through a wired and/or wireless communication network interface or adapter 1056. The adapter 1056 can facilitate wired or wireless communication to the local area network 1052, which can also include a wireless access point disposed thereon for communicating with the wireless adapter 1056.

When used in a wide area network environment, the computer 1002 can include a modem 1058, or is connected to a communications server on the wide area network 1054, or has other means for establishing communications over the wide area network 1354, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It is noted that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 12 Mbps (802.11a), 54 Mbps (802.11b), or 150 Mbps (802.11n) data rate, for example, or with products that contain both bands (dual band), so the networks can provide real-world performance similar to wired Ethernet networks used in many homes and/or offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It is noted that the memory components, or computer-readable storage media, described herein can be either volatile memory(s) or nonvolatile memory(s), or can include both volatile and nonvolatile memory(s).

By way of illustration, and not limitation, nonvolatile memory(s) can include read only memory (ROM), programmable ROM (PROM), electrically programmable ROM (EPROM), electrically erasable ROM (EEPROM), or flash memory. Volatile memory(s) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   initializing a system parameter;
   randomly generating a private key based on Diffie-Hellman key exchange between the system and a message recipient device;
   generating a base matrix pair as a function of the private key that is synchronized with another base matrix pair received by the system from the message recipient device:
   determining a threshold vector using the system parameter and the private key resulting in a synchronized threshold vector with the message recipient device, wherein the determining the threshold vector is based on a function of a summation of respective results of a set of functions of the synchronized base matrix pair and a multivariate public key, and based on a summation value received by the system from the message recipient device;
   encrypting a communication based on the synchronized threshold vector and the synchronized base matrix pair; and
   transmitting the communication to the message recipient device via a transmission device.

2. The system of claim 1, wherein the set of functions of the base matrix pair and the multivariate public key are based on a clipped Hopfield neural network.

3. The system of claim 1, wherein the set of functions of the base matrix pair are multivariate.

4. The system of claim 1, wherein the system parameter comprises a number of inputs for an artificial neuron.

5. The system of claim 1, wherein the system parameter comprises an iteration time.

6. The system of claim 1, wherein the base matrix pair is determined based on a communication received from the message recipient device.

7. The system of claim 6, wherein the communication comprises a unit array based on a number of inputs for an artificial neuron system parameter.

8. The system of claim 1, wherein the determining the threshold vector comprises determining a mask vector based on a set of randomly generated sets of vectors that have a random length.

9. A method, comprising:
   determining, by a system comprising a processor, a set of system parameters;
   generating a random private key based on a Diffie-Hellman key exchange program received by the system from a device associated with a message recipient;
   generating a base matrix pair as a function of the random private key that is synchronized with another base matrix pair of the message recipient received by the system from the device associated with the message recipient;
   synchronizing a threshold vector with another threshold vector of the message recipient using a system parameter of the set of system parameters and the random private key, wherein the synchronizing the threshold vector is based on a function of a summation of output of a set of functions of the base matrix pair and a multivariate public key, and based on a summation value received by the system from the device associated with the message recipient;
   encrypting a communication using the threshold vector and the synchronized base matrix pair; and
   transmitting, via a transmission device of the system the communication to the device associated with the message recipient.

10. The method of claim 9, wherein the set of functions of the synchronized base matrix pair and the multivariate public key are based on a clipped Hopfield neural network.

11. The method of claim 10, wherein the clipped Hopfield neural network comprises an artificial neuron with a predetermined number of inputs that have respective weight values system parameter.

12. The method of claim 9, wherein the set of functions of the base matrix pair are multivariate.

13. The method of claim 9, wherein the set of system parameters comprises an iteration time.

14. The method of claim 9, wherein the set of system parameters comprises a number of inputs for an artificial neuron.

15. The method of claim 9, further comprising:
generating, by the system, a threshold vector comprising determining a mask vector based on a set of randomly generated sets of vectors that have a random length.

16. The method of claim 9, wherein the synchronized base matrix pair is based on another communication received from the device associated with the message recipient.

17. A system, comprising:
a processor; and
a memory that stores executable instructions that, when executed by the processor, facilitate performance of operations, comprising:
receiving an electronic transmission comprising a message from a sending device;
initializing a system parameter;
randomly generating a private key based on a Diffie-Hellman key exchange between the system and the sending device;
generating a base matrix pair as a function of the private key, wherein the base matrix pair is synchronized with the sending device:
determining a threshold vector using the system parameter and the private key, wherein the determining the threshold vector is based on a function of a summation of respective outcomes of a set of functions of the base matrix pair and a multivariate public key, and further as the function of a summation value received by the system from the sending device; and
decrypting the message based on the threshold vector and the base matrix pair.

18. The system of claim 17, wherein the base matrix pair is based on a communication received from a transmitter associated with the sending device.

19. The system of claim 17, wherein the determining the threshold vector comprises determining a mask vector based on a set of randomly generated sets of vectors that have a random length.

20. The system of claim 17, wherein the set of functions of the base matrix pair are multivariate.

* * * * *